US012162535B2

(12) United States Patent
Avigur et al.

(10) Patent No.: US 12,162,535 B2
(45) Date of Patent: *Dec. 10, 2024

(54) APPARATUS FOR MEASURING STEERING ANGLE (71) Applicant: REE Automotive Ltd., Kibbutz Glil-Yam (IL)

(72) Inventors: Eylon Avigur, Ramat-Gan (IL); Tomer Lippmann, Kibbutz Glil-Yam (IL); Eran Starik, Tel Aviv (IL); Michael Oisgeld, Kibbutz Glil-Yam (IL)

(73) Assignee: REE Automotive Ltd., Kibbutz Glil-Yam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,845

(22) Filed: Jun. 9, 2023

(65) Prior Publication Data

US 2023/0311986 A1    Oct. 5, 2023

Related U.S. Application Data (63) Continuation of application No. 17/798,438, filed as application No. PCT/IL2022/050138 on Feb. 1, 2022, now Pat. No. 11,713,076.

(Continued)

(51) Int. Cl.
*B62D 15/02* (2006.01)
*B60G 17/019* (2006.01)

(52) U.S. Cl.
CPC ......... *B62D 15/023* (2013.01); *B60G 17/019* (2013.01); *B60G 2200/143* (2013.01);

(Continued)

(58) Field of Classification Search
CPC ...... B62D 15/023; B62D 7/18; B62D 15/021; B60G 17/019; B60G 2200/143;

(Continued)

(56) References Cited

U.S. PATENT DOCUMENTS 3,219,372 A * 11/1965 Herbenar ................. B62D 7/16
280/93.508
3,438,646 A * 4/1969 Hannapel ............... B62D 17/00
280/93.5

(Continued)

FOREIGN PATENT DOCUMENTS

CN    106585305 A    4/2017
CN    111874100 A    11/2020

(Continued)

OTHER PUBLICATIONS

International Search Report and Written Opinion mailed May 25, 2022, for Application No. PCT/IB2022/050138, filed Feb. 1, 2022 (8 pages).

*Primary Examiner* — Paul N Dickson
*Assistant Examiner* — Timothy Wilhelm
(74) *Attorney, Agent, or Firm* — Brown Rudnick LLP; Matthew P. York (57) ABSTRACT

An apparatus for measuring the steering angle of a wheel assembly including a suspended wheel mount and at least one suspension arm, the apparatus including a reference bracket, a rotating bracket and an angle sensor, the reference bracket and the rotating bracket each respectively including a measurement end and a mounting end, wherein the measurement ends of the reference and rotating brackets are rotatably coupled about a rotation coupling point such that the brackets can rotate with respect to one another, wherein the mounting end of the rotating bracket is coupled with the suspended wheel mount and the mounting end of the reference bracket is coupled with the suspension arm, and wherein the mounting end of the reference bracket is positioned on a plane defined by a steering axis of the suspend-wheel mount and a rotation axis between the suspension arm and the suspended wheel mount.

20 Claims, 7 Drawing Sheets

Related U.S. Application Data (60) Provisional application No. 63/143,982, filed on Feb. 1, 2021.

(52) U.S. Cl.
CPC .... *B60G 2200/144* (2013.01); *B60G 2204/11* (2013.01); *B60G 2206/50* (2013.01)

(58) Field of Classification Search
CPC .......... B60G 2200/144; B60G 2204/11; B60G 2206/50; B60G 2200/445; B60G 2200/46; B60G 2204/421; B60G 2400/05144; B60G 2401/172; B60G 2401/26
See application file for complete search history.

(56) References Cited

U.S. PATENT DOCUMENTS

| | | | | |
|---|---|---|---|---|
| 4,029,337 A * | 6/1977 | Bishop | B62D 17/00 | 280/93.5 |
| 4,372,418 A * | 2/1983 | Dangel | B60G 13/006 | 180/256 |
| 4,545,601 A * | 10/1985 | Muller | B60G 3/26 | 267/67 |
| 4,582,338 A * | 4/1986 | Colanzi | F16F 9/54 | 301/125 |
| 4,679,957 A * | 7/1987 | Bauer | F16C 11/0619 | 403/115 |
| 4,775,026 A * | 10/1988 | Sollbach | F16H 48/24 | 475/150 |
| 4,798,394 A * | 1/1989 | Pollock | B62D 7/18 | 280/93.512 |
| 4,944,524 A * | 7/1990 | Achenbach | F16F 1/505 | 267/221 |
| 4,962,834 A * | 10/1990 | Miner | B60G 15/067 | 267/221 |
| 4,995,633 A * | 2/1991 | Santo | B60G 15/062 | 280/124.145 |
| 5,326,084 A * | 7/1994 | Mevissen | B60G 21/0551 | 267/221 |
| 5,636,703 A * | 6/1997 | Papke | B62D 15/02 | 180/446 |
| 5,767,767 A * | 6/1998 | Lima | B60R 16/037 | 340/440 |
| 5,772,168 A * | 6/1998 | Nakazawa | B60G 13/006 | 248/300 |
| 5,797,618 A * | 8/1998 | Brokholc | B60G 99/00 | 280/124.149 |
| 6,089,582 A * | 7/2000 | Hasshi | B62D 7/18 | 280/93.512 |
| 6,126,177 A * | 10/2000 | Steinert | B60G 17/01933 | 280/DIG. 1 |
| 6,261,182 B1 * | 7/2001 | Chino | F16D 3/20 | 464/100 |
| 6,269,920 B1 * | 8/2001 | Handke | B60G 15/07 | 280/124.145 |
| 6,293,022 B1 * | 9/2001 | Chino | B62D 15/023 | 33/203.18 |
| 6,305,701 B1 * | 10/2001 | Bobinger | B60G 21/0551 | 280/124.145 |
| 6,311,402 B1 * | 11/2001 | Brandl | G01D 5/04 | 33/1 PT |
| 6,341,678 B1 * | 1/2002 | Hoyte | B60G 15/07 | 188/321.11 |
| 6,367,830 B1 * | 4/2002 | Annequin | B60G 15/063 | 280/124.145 |
| 6,494,471 B2 * | 12/2002 | Lukac | B60G 17/019 | 280/93.5 |
| 6,502,839 B1 * | 1/2003 | Chino | B62D 7/18 | 33/1 PT |
| 6,533,230 B2 * | 3/2003 | Fullenkamp | B60G 15/07 | 248/300 |
| 6,568,696 B2 * | 5/2003 | Osborn | B62D 15/023 | 280/93.5 |
| 6,715,777 B2 * | 4/2004 | Sasse | B60G 15/07 | 267/218 |
| 6,883,816 B2 * | 4/2005 | Baker | F16C 33/586 | 280/93.512 |
| 6,959,497 B2 * | 11/2005 | Leidinger | G01D 5/34738 | 33/534 |
| 7,097,184 B2 * | 8/2006 | Kapaan | B62D 15/02 | 280/93.512 |
| 7,296,810 B2 * | 11/2007 | Thannikary | G01D 11/245 | 280/93.5 |
| 7,347,433 B2 * | 3/2008 | Pressler | B62D 15/023 | 280/93.5 |
| 7,405,557 B2 * | 7/2008 | Spratte | B60G 7/005 | 324/261 |
| 7,413,201 B2 * | 8/2008 | Freytag | B60G 3/24 | 403/27 |
| 7,490,840 B2 * | 2/2009 | Luttinen | B60G 3/06 | 280/124.126 |
| 7,530,586 B2 * | 5/2009 | Tardy-Tuch | B60G 13/005 | 280/124.145 |
| 7,543,831 B2 * | 6/2009 | Pope | B62D 15/023 | 280/93.5 |
| 7,574,926 B2 * | 8/2009 | Anderson | A01D 46/08 | 73/862.325 |
| 7,614,629 B2 * | 11/2009 | Dinakaran | B60G 7/008 | 280/93.512 |
| 7,712,753 B2 * | 5/2010 | McCann | B60G 3/06 | 280/93.511 |
| 7,988,166 B2 * | 8/2011 | Heeren | B60G 13/006 | 280/124.1 |
| 8,025,116 B2 * | 9/2011 | Rogg | B60K 7/0007 | 180/65.6 |
| 8,061,726 B2 * | 11/2011 | Kunert | B60G 3/20 | 280/124.144 |
| 8,240,688 B2 * | 8/2012 | Miyamoto | F16F 1/377 | 280/124.152 |
| 8,579,312 B2 * | 11/2013 | Koumura | B60G 21/0551 | 280/124.152 |
| 8,708,356 B2 * | 4/2014 | Rohde | B60G 13/006 | 280/124.145 |
| 8,777,244 B2 * | 7/2014 | Seethaler | B60G 3/06 | 280/124.17 |
| 8,919,794 B2 * | 12/2014 | Kunert | B60G 21/0551 | 280/124.152 |
| 9,004,511 B1 * | 4/2015 | Rosepiler | B60G 21/0551 | 280/124.109 |
| 9,085,302 B2 * | 7/2015 | Borroni-Bird | B60T 13/74 | |
| 9,272,729 B2 * | 3/2016 | Minoshima | B62D 5/06 | |
| 9,447,832 B2 * | 9/2016 | Todd | B60T 17/088 | |
| 9,580,108 B2 * | 2/2017 | Mentzel | B60G 15/07 | |
| 9,676,240 B2 * | 6/2017 | Hinz | B60G 15/12 | |
| 9,878,588 B2 * | 1/2018 | von Hasselbach | B60G 3/01 | |
| 9,964,457 B2 * | 5/2018 | Duff | G01M 17/007 | |
| 10,618,554 B2 * | 4/2020 | Passero | B62D 7/18 | |
| 10,836,230 B2 * | 11/2020 | Hintzen | B60G 3/06 | |
| 10,906,372 B2 * | 2/2021 | Shibuya | B60K 7/0007 | |
| 10,926,596 B2 * | 2/2021 | Lorenz | B60G 3/20 | |
| 11,230,154 B2 * | 1/2022 | Høiland | B60G 21/0551 | |
| 11,352,056 B2 * | 6/2022 | Moon | B60G 7/005 | |
| 11,465,489 B2 * | 10/2022 | Nagayama | B60G 3/06 | |
| 11,713,076 B2 * | 8/2023 | Avigur | B60G 17/019 | 280/93.502 |
| 11,859,658 B2 * | 1/2024 | Kerner | F16C 11/0609 | |
| 2002/0135213 A1 * | 9/2002 | Fullenkamp | B60G 15/063 | 297/311 |
| 2004/0140640 A1 * | 7/2004 | Frantzen | B60G 21/0551 | 280/124.145 |
| 2007/0001416 A1 * | 1/2007 | Freytag | B60G 3/24 | 280/93.512 |
| 2007/0045036 A1 * | 3/2007 | Takeuchi | B62D 5/0418 | 280/124.145 |
| 2009/0057528 A1 * | 3/2009 | Moravy | F16F 9/54 | 188/266.5 |

(56) References Cited

U.S. PATENT DOCUMENTS

| | | | | |
|---|---|---|---|---|
| 2010/0223974 A1* | 9/2010 | Kucinski | ................ | B21D 51/06 |
| | | | | 72/324 |
| 2019/0225286 A1* | 7/2019 | Schutt | ........................ | G01L 1/04 |
| 2021/0253159 A1* | 8/2021 | Toyoda | ................ | B62D 15/021 |
| 2021/0339799 A1* | 11/2021 | Tonini | .................. | B62D 15/023 |
| 2022/0266905 A1* | 8/2022 | Krone | .................. | B62D 15/021 |

FOREIGN PATENT DOCUMENTS

| | | | | |
|---|---|---|---|---|
| EP | 0423080 A1 * | 4/1991 | ........... | B62D 15/023 |
| EP | 3268263 B1 | 12/2018 | | |

* cited by examiner

APPARATUS FOR MEASURING STEERING ANGLE

CROSS-REFERENCE TO RELATED APPLICATIONS

The present application is a continuation of U.S. application Ser. No. 17/798,438, filed Aug. 9, 2022, which is a national stage entry of PCT/IL2022/050138 with an International Filing Date of Feb. 1, 2022, which claims the benefit of and priority to U.S. Provisional Application No. 63/143,982, filed Feb. 1, 2021, the contents of each of which are incorporated by reference herein their entirety.

FIELD OF THE DISCLOSED TECHNIQUE

The disclosed technique relates to a steering system in general, and to an apparatus for measuring a steering angle in particular.

BACKGROUND OF THE DISCLOSED TECHNIQUE

Measuring the steering angle in vehicles in general, and in autonomous vehicles in particular may provide information which can be employed for controlling the vehicle, for example, by providing feedback to a control system or alerting before steering lock occurs.

U.S. Pat. No. 6,568,696 to Osborn et al., entitled "Kingpin Angle Mounted Sensor" is directed to an angle sensor for sensing the angular position of a steerable wheel and hub relative to a longitudinal axis of a vehicle. The angle sensor is mounted in a bore in the kingpin. Thus, the angle sensor is made a part of the kingpin that supports the rotating wheel hub to its fixed wheel support housing on the axle of the vehicle.

U.S. Pat. No. 7,347,433 to Pressler et al., entitled "Wheel and Steering Sensor System" is directed to a steerable element angular sensor system. The sensor system includes a sensor shaft which includes a sensing axis. The sensing axis is positioned along an axis of rotation of a knuckle. A connector connects a yoke and the knuckle of the steering system. A sensor arm includes a first end attached to the sensor shaft and a second end for connecting to the knuckle traces movement of the knuckle about the axis of rotation of the knuckle. The sensor detects rotation of the knuckle and the connector.

U.S. Pat. No. 7,413,201 to Freytag et al., entitled "Steering System" is directed to a steering system with single-wheel suspensions, which are mounted on a respective wheel carrier. Each wheel carrier may be rotated about an axis of a rigidly connected swivel bolt. Each wheel carrier is further connected via a ball-and-socket joint on the swivel bolt, to a transverse steering element that is articulated to body of a vehicle. A steering angle sensor, including a rotatable input member, is located at an extension of the axis of the swivel bolt. The rotatable input member of the sensor is connected to the swivel bolt via an entrainment element that transmits the swivel motion of the bolt to detect the current swivel position of the wheel carrier.

SUMMARY OF THE PRESENT DISCLOSED TECHNIQUE

It is an object of the disclosed technique to provide a novel apparatus for measuring the steering angle of a wheel assembly including a suspended wheel mount and at least one suspension arm. According to an aspect of the disclosed technique, the apparatus includes a reference bracket, a rotating bracket and an angle sensor. The reference bracket includes a measurement end and a mounting end and the rotating bracket includes a measurement end and a reference end. The angle sensor is configured for measuring an angle between the reference bracket and the rotating bracket. The measurement end of the reference bracket and the measurement end of the rotating bracket are rotatably coupled about a rotation coupling point such that the reference bracket and the rotating bracket can rotate with respect to one another. The mounting end of the rotating bracket is coupled with the suspended wheel mount and the mounting end of the reference bracket is coupled with the suspension arm. The mounting end of the reference bracket is positioned on a plane defined by a steering axis of the suspended wheel mount and a rotation axis between the suspension arm and the suspended wheel mount during vertical motion of the suspended wheel mount. The vertical motion is relative to a reference frame.

According to another aspect of the disclosed technique, the apparatus includes a reference bracket, a rotating bracket and an angle sensor. The reference bracket includes a measurement end and a mounting end and the rotating bracket includes a measurement end and a reference end. The angle sensor is configured for measuring an angle between the reference bracket and the rotating bracket. The measurement end of the reference bracket and the measurement end of the rotating bracket are rotatably coupled about a rotation coupling point such that the reference bracket and the rotating bracket can rotate with respect to one another. The mounting end of the rotating bracket is coupled with the suspended wheel mount and the mounting end of the reference bracket is coupled with the suspension arm. The coupling of the mounting end of the reference bracket with the suspension arm is such that the reference bracket is at a fixed spatial relationship relative to an intersection point of a steering axis of the suspended wheel mount and a rotation axis between the suspension arm and the suspended wheel mount during vertical motion of the suspended wheel mount. The vertical motion is relative to a reference frame.

According to a further aspect of the disclosed technique, the apparatus includes a reference bracket, a rotating bracket and an angle sensor. The reference bracket includes a measurement end and a mounting end and the rotating bracket includes a measurement end and a reference end. The angle sensor is configured for measuring an angle between the reference bracket and the rotating bracket. The measurement end of the reference bracket and the measurement end of the rotating bracket are rotatably coupled about a rotation coupling point such that the reference bracket and the rotating bracket can rotate with respect to one another. The mounting end of the rotating bracket is coupled with the suspended wheel mount and the mounting end of the reference bracket is coupled with the suspension arm. The mounting end of the reference bracket is positioned on a plane defined by a line perpendicular to a steering axis of the suspended wheel mount and an intersection point of the steering axis with a rotation axis between the suspension arm and the suspended wheel mount during vertical motion of the suspended wheel mount. The vertical motion is relative to a reference frame.

According to another aspect of the disclosed technique, the apparatus includes a reference bracket, a rotating bracket and an angle sensor. The reference bracket includes a measurement end and a mounting end and the rotating bracket includes a measurement end and a reference end.

The angle sensor is configured for measuring an angle between the reference bracket and the rotating bracket. The measurement end of the reference bracket and the measurement end of the rotating bracket are rotatably coupled about a rotation coupling point such that the reference bracket and the rotating bracket can rotate with respect to one another. The mounting end of the rotating bracket is coupled with the suspended wheel mount and the mounting end of the reference bracket is coupled with the suspension arm. The mounting end of the reference bracket is located on a rotation axis between the suspension arm and the suspended wheel mount. A longitudinal section of the reference bracket is parallel with a steering axis of the suspended wheel mount during vertical motion of the suspended wheel mount. The vertical motion is relative to a reference frame.

According to a further aspect of the disclosed technique, the measurement end of the reference bracket extends perpendicularly from a longitudinal section of the reference bracket. According to another aspect of the disclosed technique, a longitudinal section of the reference bracket is perpendicular with the steering axis. According to some aspects of the disclosed technique, the mounting end of the reference bracket is located on the rotation axis between the suspension arm and the suspended wheel mount. According to some aspects of the disclosed technique, the plane coincides with the suspension arm such that the rotation coupling point is located on the steering axis. According to some aspects of the disclosed technique, the plane is located on the rotation axis between the suspension arm and the suspended wheel mount.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing an apparatus for measuring a steering angle of a suspended wheel relative to a reference frame in a wheel assembly, regardless of vertical motion of the wheel. Some wheel assemblies do not include a physical shaft at the steering axis that may hold the sensor for measuring a rotation of the suspended wheel mount with respect to the reference frame. When connecting a steering sensor between a steered suspended wheel mount and a stationary reference frame, the measured angle should not be affected by the vertical motion of the suspended wheel mount with respect to the reference frame.

The apparatus according to the disclosed technique includes a reference bracket, a rotating bracket and an angle sensor. A measurement end of the reference bracket is rotatably coupled with a measurement end of the rotating bracket such that the reference bracket and the rotating bracket can rotate with respect to one another about a rotating coupling point (also referred to as a rotation coupling point). The mounting end of the rotating bracket is coupled with the suspended wheel mount and the mounting end of the reference bracket is coupled with a suspension arm, such that the rotating coupling point is located on the steering axis, and the reference bracket and the rotating bracket rotate with respect to one another about the steering axis. Also, the reference bracket is coupled with the suspension arm such that the reference bracket is at a fixed spatial relationship relative to the intersection point of the steering axis and the rotation axis between the suspension arm and the suspended wheel mount, during a vertical motion of the suspended wheel mount. According to another alternative of the disclosed technique, the reference bracket is coupled with the suspension arm such that the mounting end of the suspension arm is located on the rotation axis between the suspension arm and the suspended wheel mount. According to a further alternative of the disclosed technique, a mounting end of the reference bracket is positioned on a plane defined by a line perpendicular to the steering axis and an intersection point of the steering axis and the rotation axis between the suspension arm and the suspended wheel mount, during a vertical motion of the suspended wheel mount relative to the reference frame. Thus, the rotation axis of the angle sensor remains aligned with the steering axis during vertical motion of the suspended wheel mount.

In the explanations which follow, the plane over which a vehicle maneuvers is referred to herein as a "horizontal plane" and an axis perpendicular to such a horizontal plane is referred to herein as a "vertical axis". When the vehicle is a wheeled vehicle, the "horizontal plane" may be the plane (e.g., terrain) over which a wheel rolls. The terms "vertical motion" and "motion in the vertical direction" relate herein to motion along a vertical direction as per the above definition. Also, the term "in-motion direction" relates to the direction along which the wheel rolls (e.g., longitudinal direction of the vehicle). Typically, the in-motion axis is parallel (or substantially parallel, for example, when the wheel has a camber angle) to the horizontal plane. The term "lateral axis" relates to an axis perpendicular (or substantially perpendicular) to both the vertical axis and the in-motion axis, pointing in a direction perpendicular to the direction toward which the wheel rolls (i.e., lateral direction). Also, the terms "coupled at pivot point", "pivotally coupled", "coupled at rotation point" and "rotatably coupled" are all employed herein interchangeably and relate to two elements coupled such that these two elements may rotate with respect to one another. Furthermore, a reference frame herein relates, for example, to a chassis of a vehicle, or a frame of an assembly (e.g., a wheel assembly) attachable to a chassis of a vehicle.

Figure 1A:
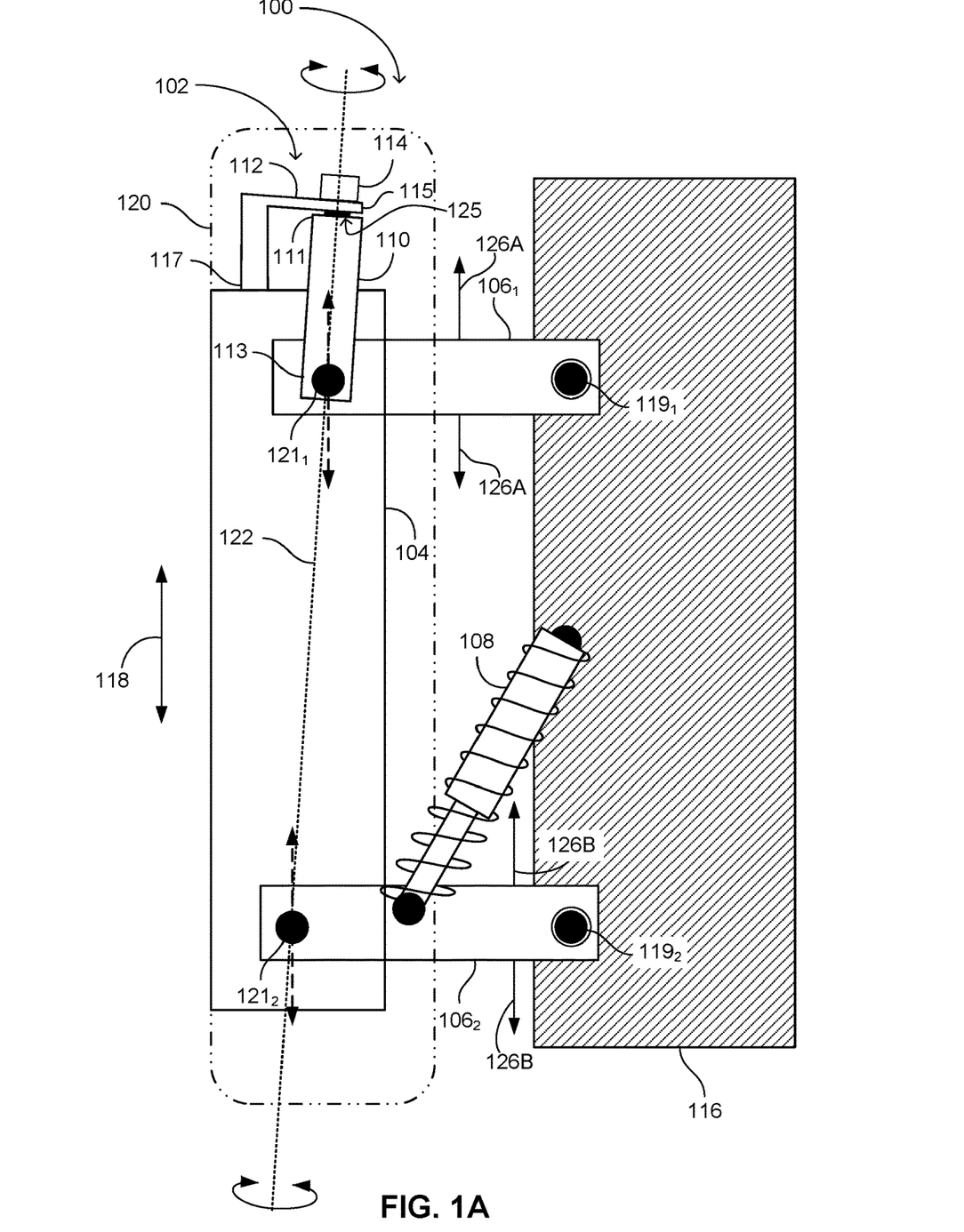
FIGS. 1A, 1B and 1C are schematic illustrations of a first wheel angle measurement apparatus for a wheel assembly constructed and operative in accordance with an embodiment of the disclosed technique.
Figure 1B:
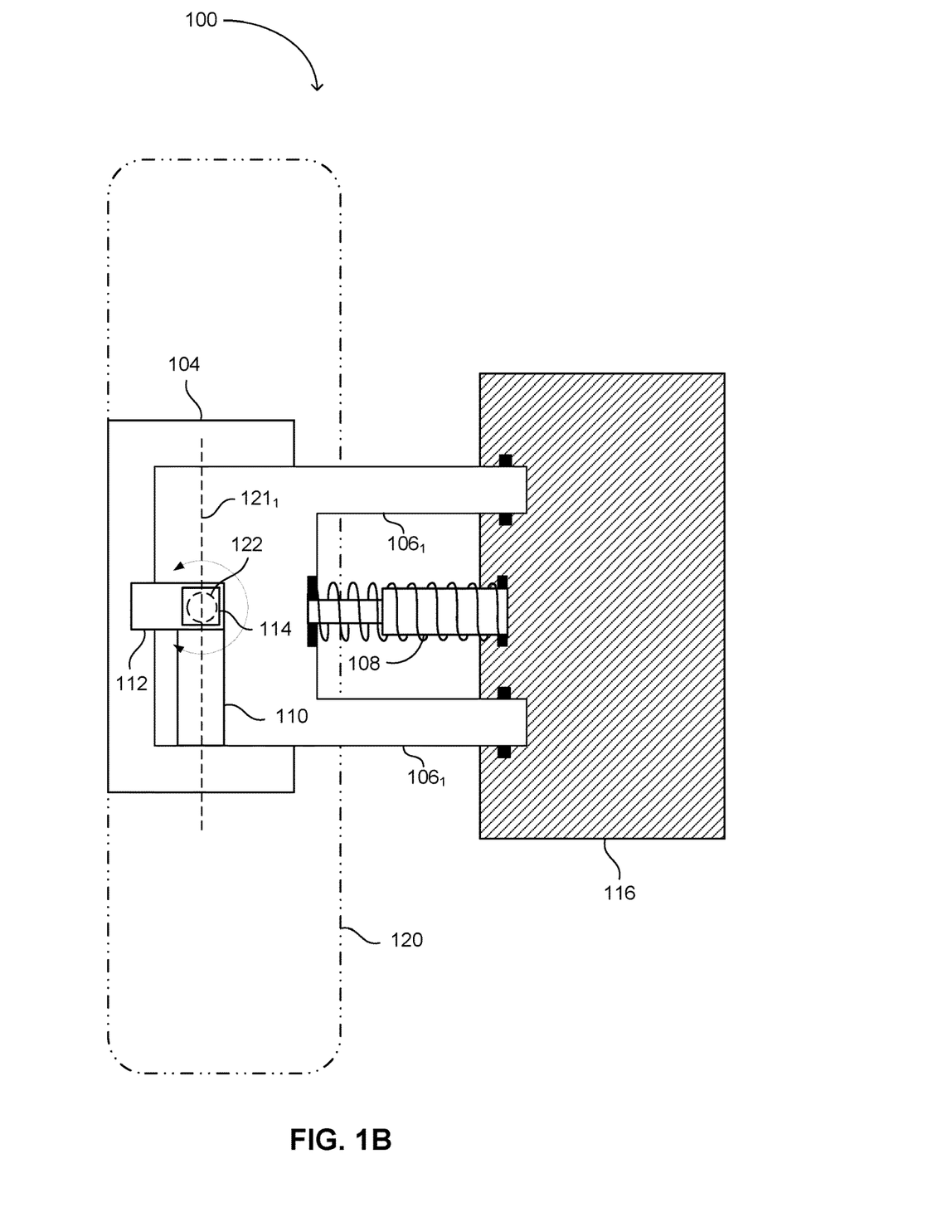
Figure 1C:
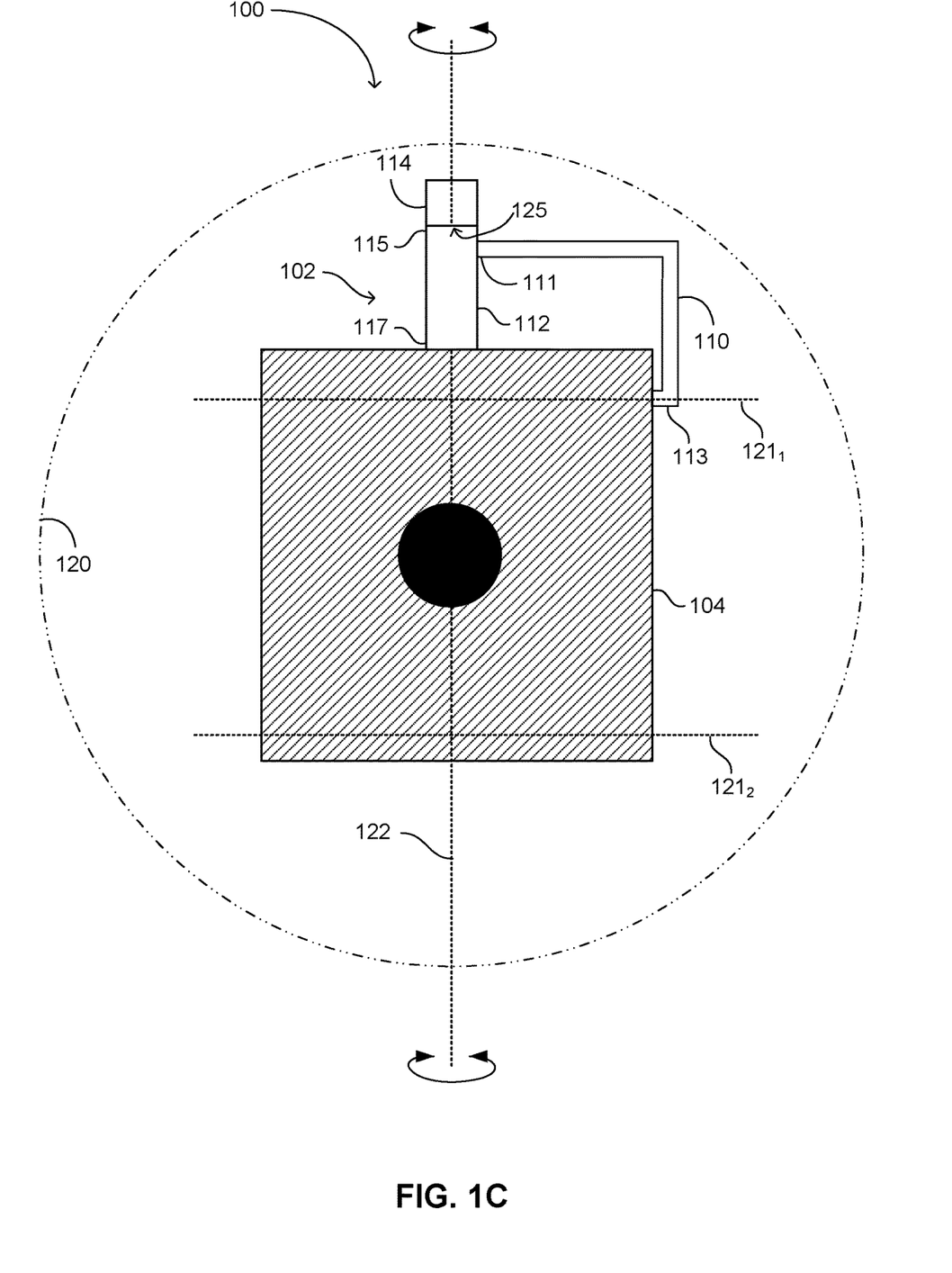

Reference is now made to FIGS. 1A, 1B and 1C, which are schematic illustrations of a first wheel angle measurement apparatus, generally referenced 102, for a wheel assembly, generally referenced 100, constructed and operative in accordance with an embodiment of the disclosed technique. FIG. 1A is a front/rear view of wheel assembly 100, FIG. 1B is a top view of wheel assembly 100 and FIG. 1C is a side view of wheel assembly 100. Wheel assembly 100 is an exemplary wheel assembly employed herein for describing the operation of wheel angle measurement apparatus 102. Wheel assembly 100 includes a suspended wheel mount 104, two suspension arms, a first suspension arm 1061 and a second suspension arm 1062. Wheel assembly 100 may further include a spring-damper assembly 108. Wheel angle measurement apparatus 102 includes a reference bracket 110, a rotating bracket 112 and an angle sensor 114. Reference bracket 110 includes a measurement end 111 and a mounting end 113. Similarly, rotating bracket 112 includes a measurement end 115 and a mounting end 117.

One end of first suspension arm $106_1$ is rotatably coupled with a reference frame 116 such that first suspension arm $106_1$ and reference frame 116 are operable to rotate with respect to one another about an axis $119_1$. Another end of first suspension arm $106_1$ is rotatably coupled with suspended wheel mount 104 (e.g., via a ball joint) such that first suspension arm $106_1$ and suspended wheel mount 104 are operable to rotate with respect to one another about an axis $121_1$ and about a steering axis 122. Similarly, one end of second suspension arm $106_2$ is rotatably coupled with a reference frame 116 such that second suspension arm $106_2$ and reference frame 116 are operable to rotate with respect to one another about an axis $119_2$, and another end of second suspension arm $106_2$ is rotatably coupled (e.g., via a ball joint) with suspended wheel mount 104 such that second suspension arm $106_2$ and suspended wheel mount 104 are operable to rotate with respect to one another about an axis $121_2$ and about steering axis 122. Axes $119_1$, $119_2$, $121_1$ and $121_2$ are oriented such that suspended wheel mount 104 may move, relative to reference frame 116, in the vertical direction as indicated by an arrow 118.

In exemplary wheel assembly 100, one end of spring-damper assembly 108 is rotatably coupled with reference frame 116 such that spring-damper assembly 108 and reference frame 116 are operable to rotate with respect to one another. The other end of spring-damper assembly 108 is rotatably coupled with second suspension arm 1062 such that spring-damper assembly 108 and second suspension arm 1062 are operable to rotate with respect to one another.

Suspended wheel mount 104 is configured to be mounted with a wheel 120. Also, suspended wheel mount 104 is configured to rotate about a rotation axis (i.e., steering axis 122), for example, for steering purposes. According to the disclosed technique, wheel angle measurement apparatus 102 is configured to measure the rotation angle of suspended wheel mount 104 about axis 122. To that end, measurement end 111 of reference bracket 110 is rotatably coupled at a measurement end 115 of rotating bracket 112 such that reference bracket 110 and rotating bracket 112 can rotate with respect to one another about rotating coupling point 125. Mounting end 117 of rotating bracket 112 is coupled with suspended wheel mount 104. Mounting end 113 of reference bracket 110 is coupled with first suspension arm 1061 such that rotating coupling point 125 with rotating bracket 112 is located on steering axis 122, and reference bracket 110 and rotating bracket 112 rotate with respect to one another about steering axis 122. Also, reference bracket 110 is coupled with suspension arm 1061 such that reference bracket 110 (i.e., any selected point on reference bracket 110) is at a fixed spatial relationship relative to the intersection point of steering axis 122 and axis 1211 during a vertical motion of suspended wheel mount 104 relative to reference frame 116. In the embodiment described herein in conjunction with FIGS. 1A-1C, measurement end 111 of reference bracket 110 perpendicularly extends from a longitudinal section of reference bracket 110. According to another alternative, reference bracket 110 is coupled with the suspension arm 1061 such that mounting end 113 of reference bracket 110 is located on rotation axis $121_1$ between the suspension arm and the suspended wheel mount and a longitudinal section of reference bracket 110 is parallel with steering axis 122 during a vertical motion of suspended wheel mount 104 relative to reference frame 116. According to yet another alternative, mounting end 113 of the reference bracket 110 is positioned on a plane defined by a line perpendicular (or substantially perpendicular) to steering axis 122 and the intersection point of steering axis 122 and axis $121_1$ during a vertical motion of suspended wheel mount 104 relative to reference frame 116.

According to yet another alternative embodiment, mounting end 113 of reference bracket 110 is positioned on a plane defined by steering axis 122 and axis $121_1$ during a vertical motion of suspended wheel mount 104 relative to reference frame 116. According to some embodiments, mounting end 113 is located on axis $121_1$.

Angle sensor 114 is coupled with rotating bracket 112 and with reference bracket 110 at rotating coupling point 125. Thus, angle sensor 114 is configured for measuring the angle between reference bracket 110 and rotating bracket 112 and thus the angle between suspended wheel mount 104 (and thus wheel 120) and reference frame 116. Angle sensor 114 is, for example, a rotary potentiometer, a rotary magnetic hall-effect sensor or a rotary optical encoder.

As suspended wheel mount 104 rotates, rotating bracket 112 rotates therewith. Thus, rotating bracket 112 rotates relative to reference bracket 110 (i.e., since reference bracket is coupled with suspension arm 1061 which does not rotate with suspended wheel mount 104). As suspended wheel mount 104 rotates, angle sensor 114 measures the relative angle between rotating bracket 112 and reference bracket 110. Thus, angle sensor 114 measures the rotation angle of suspended wheel mount about axis 122 (i.e., relative to reference frame 116), regardless of any vertical relative motion between suspended wheel mount 104 and reference frame 116. It is noted that suspension arm 1061 is coupled with suspended wheel mount 104 such that the coupling point at axis 1211 coincides with the kingpin of the suspended wheel mount. Thus according to the disclosed technique, angle sensor 114 can be prevented from experiencing any kind of analogous bump steer that may affect the steering angle measurement by angle sensor 114. The referred to analogous bump steer refers to any unintentional movement of reference bracket 110 with respect to rotating bracket 112 caused by the movement of mounting end 113 not remaining on an axis parallel to steering axis 122. The term "analogous" is used here as the referred to unintentional movement of reference bracket 110 is similar to the known concept of bump steer that happens in road vehicles when a suspended wheel mount unintentionally rotates/steers due to a bump in the road. Within the context of the disclosed technique, analogous bump steer refers to an unintentional movement of reference bracket 110 (and not to an unintentional movement of suspended wheel mount 104). According to the disclosed technique, suspension arm 1061 is directly coupled with suspended wheel mount 104 and suspension arm 1061 is also directly coupled with mounting end 113 of reference bracket 110. Due to the location of mounting end 113, any unintentional vertical movement of suspension arm 1061 or unintentional horizontal movement of suspended wheel mount 104 will not cause any unintentional movement of reference bracket 110 with respect to rotating bracket 112, thereby avoiding analogous bump steer. As mentioned above, according to the disclosed technique, any unintentional movement between reference bracket 110 and rotating bracket 112, which is not due to actual steering (i.e., turning movement of suspended wheel mount 104), is substantially avoided as the motion of suspension arm 1061 (shown by arrows 126A) is independent of the motion of suspended wheel mount 104 as it rotates around steering axis 122. The steering angle of suspended wheel mount 104 can thus be measured independent of the angle (not shown) of suspension arm 106₁ as it moves in the directions of arrows 126A.

Figure 2A:
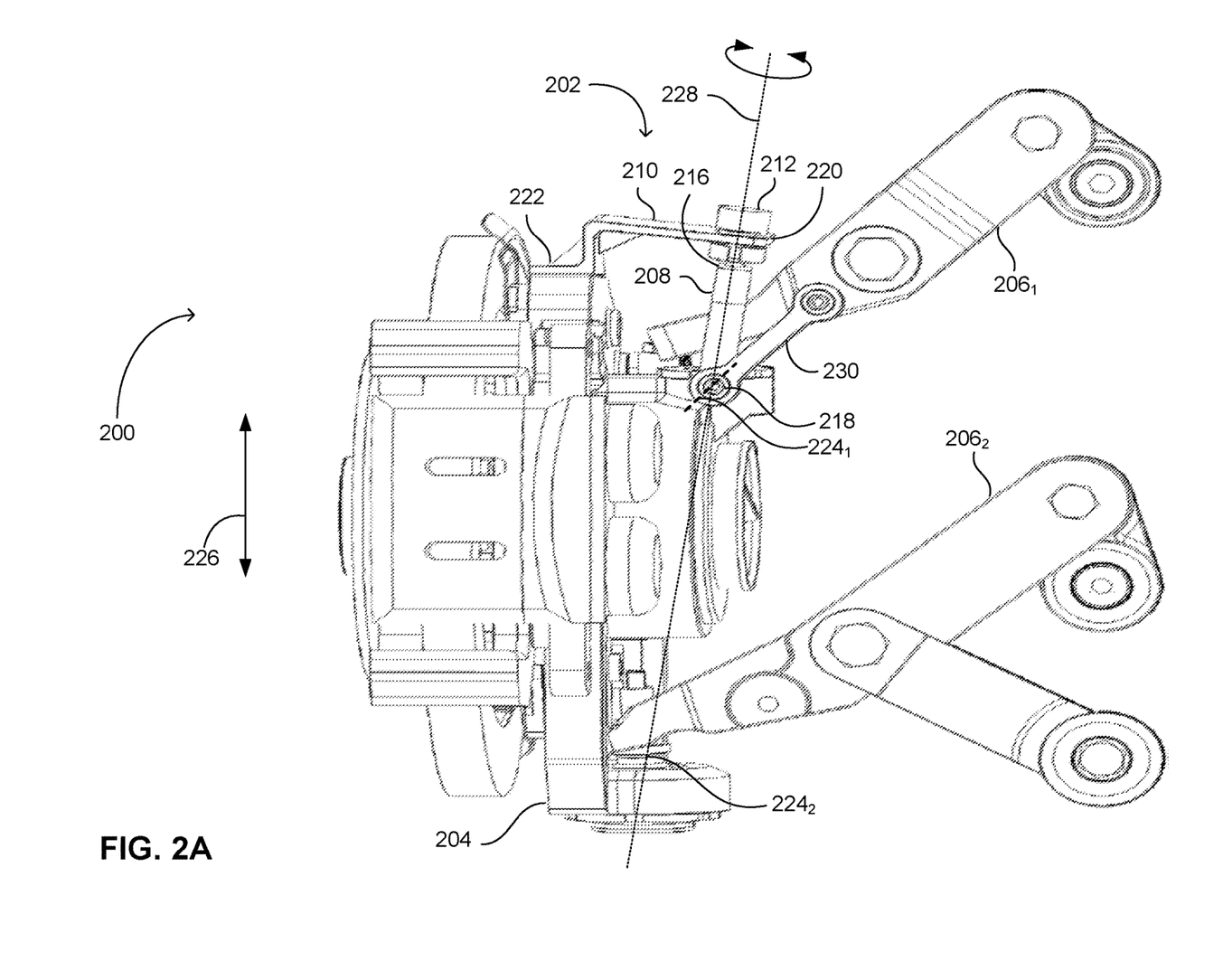
FIGS. 2A, 2B and 2C are schematic illustrations of a second wheel angle measurement apparatus for a wheel assembly constructed and operative in accordance with another embodiment of the disclosed technique.
Figure 2B:
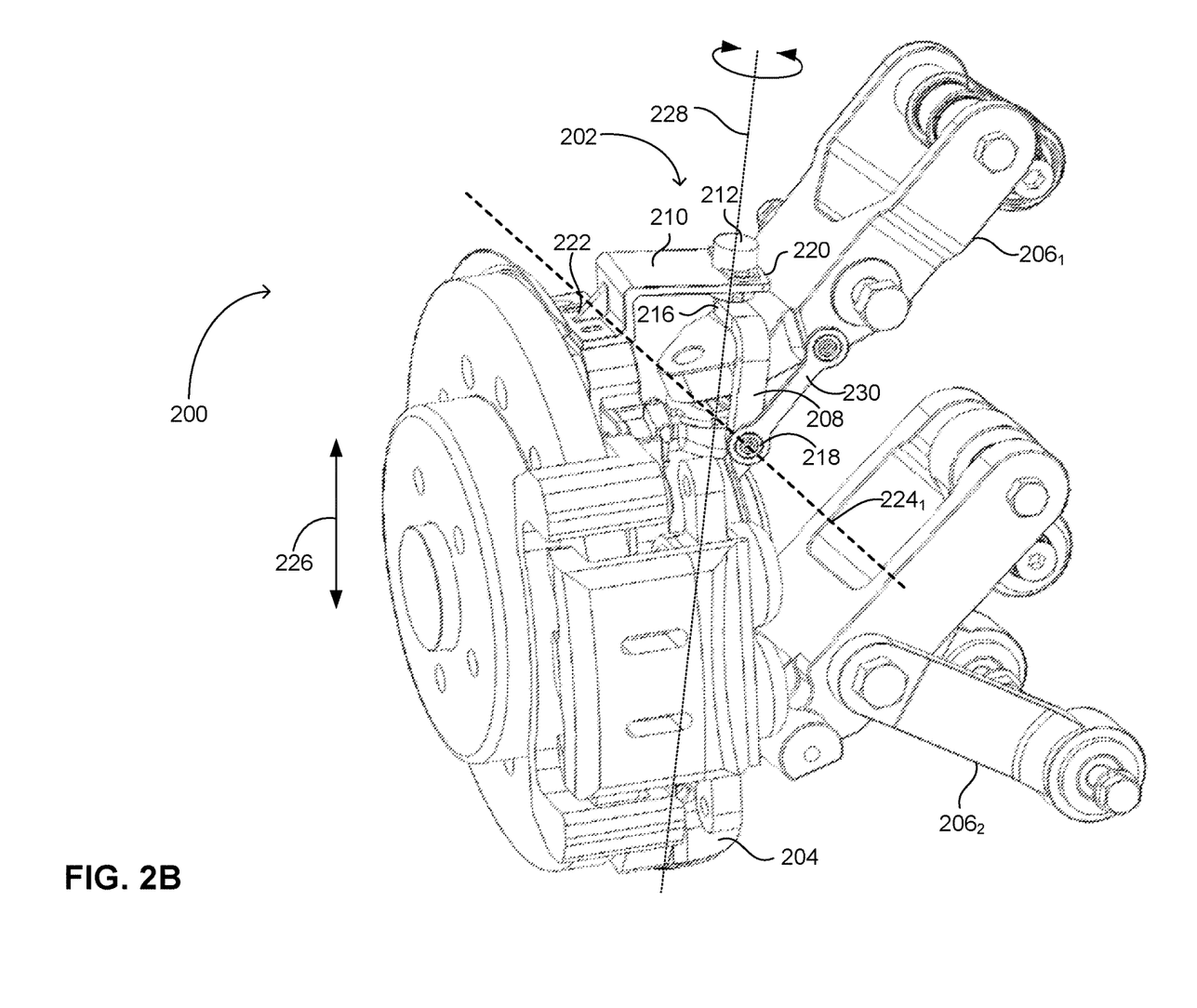
Figure 2C:
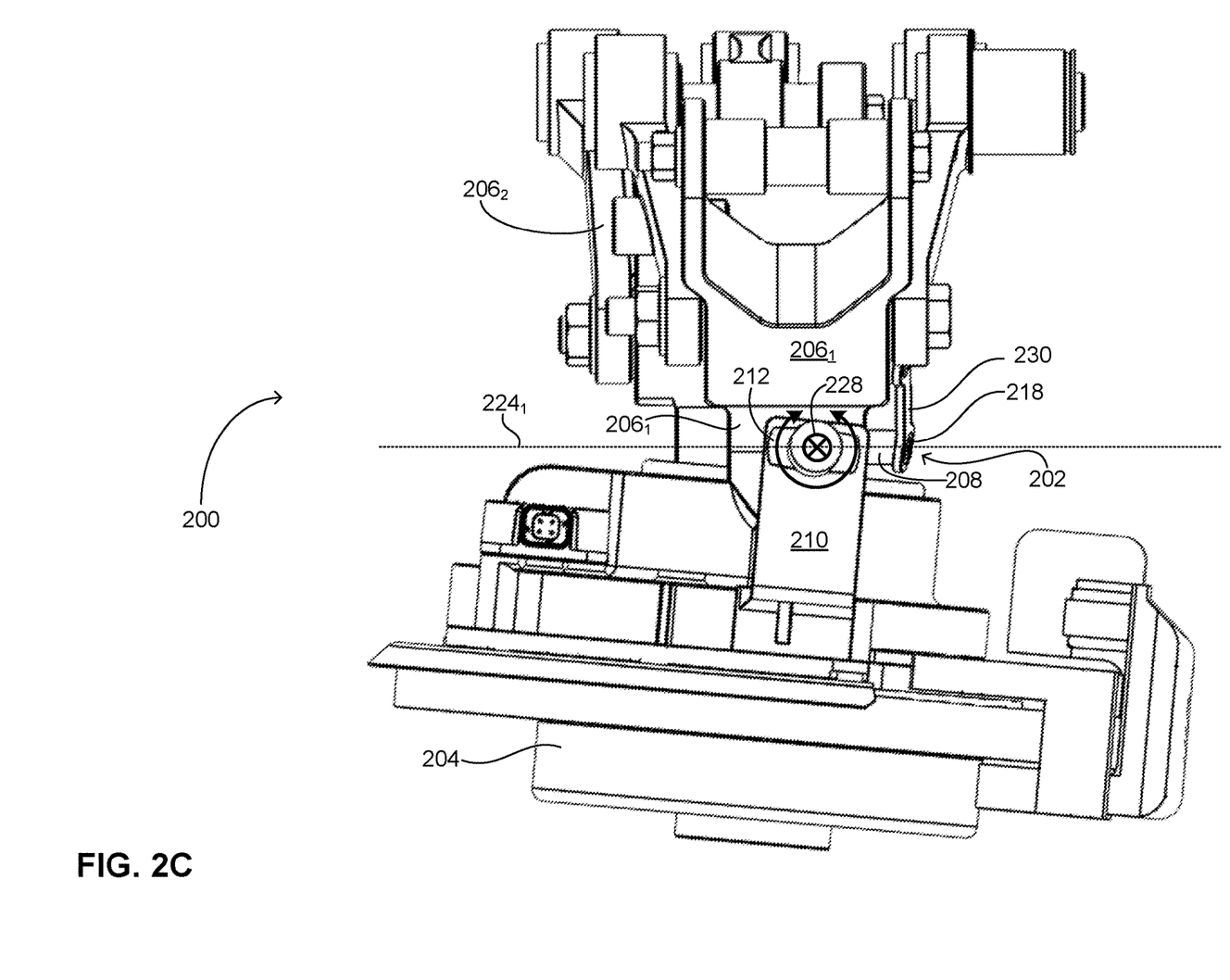

Reference is now made to FIGS. 2A, 2B and 2C, which are schematic illustrations of a second wheel angle measurement apparatus, generally referenced 202, for a wheel assembly, generally referenced 200, constructed and operative in accordance with another embodiment of the disclosed technique. FIG. 2A is a side view of wheel assembly 200, FIG. 2B is an isometric view of wheel assembly 200 and FIG. 2C is a top view of wheel assembly 200 in a slightly steered position.

Wheel assembly 200 includes a suspended wheel mount 204 and two suspension arms, a first suspension arm 206₁ and a second suspension arm 206₂. Wheel angle measurement apparatus 202 includes a reference bracket 208, a rotating bracket 210 and an angle sensor 212. Reference bracket 208 includes a measurement end 216 and a mounting end 218. Similarly, rotating bracket 210 includes a measurement end 220 and a mounting end 222.

One end of first suspension arm 206₁ is rotatably coupled with a reference frame (e.g., similar to reference frame 104 in FIGS. 1A-1C yet not shown in FIGS. 2A-2C) such that first suspension arm 206₁ and the reference frame are operable to rotate with respect to one another. Another end of first suspension arm 206₁ is rotatably coupled with suspended wheel mount 204 such that first suspension arm 206₁ and suspended wheel mount 204 are operable to rotate with respect to one another about an axis 224₁. Similarly, one end of second suspension arm 206₂ is rotatably coupled with a reference frame such that second suspension arm 206₂ and the reference frame are operable to rotate with respect to one another about axis. Another end of second suspension arm 206₂ is rotatably coupled with suspended wheel mount 204 such that second suspension arm 206₂ and suspended wheel mount 204 are operable to rotate with respect to one another about an axis 224₂. Axes 224₁ and 224₂ are oriented such that suspended wheel mount 204 may move, relative to the reference frame, in the vertical direction as indicated by an arrow 226.

Suspended wheel mount 204 is configured to be mounted with a wheel (not shown). Also, suspended wheel mount 204 is configured to rotate about a rotation axis 228, for example, for steering purposes. According to the disclosed technique, wheel angle measurement apparatus 202 is configured to measure the rotation angle of suspended wheel mount 204 about axis 228. To that end, measurement end 216 of reference bracket 208 is rotatably coupled at a measurement end 220 of rotating bracket 210 such that reference bracket 208 and rotating bracket 210 can rotate with respect to one another about a rotating coupling point (not labeled). Mounting end 222 of rotating bracket 210 is coupled with suspended wheel mount 204. Mounting end 218 of reference bracket 208 is coupled with first suspension arm 206₁ such that the rotating coupling point with reference bracket 208 is located on steering axis 228, and reference bracket 208 and rotating bracket 210 rotate with respect to one another about steering axis 228. Also, reference bracket 208 is coupled with suspension arm 206₁ such that reference bracket 208 (i.e., any selected point on reference bracket 208) is at a fixed spatial relationship relative to the intersection point of steering axis 228 and axis 224₁ during a vertical motion of suspended wheel mount 204 relative to the reference frame. In FIGS. 2A, 2B and 2C, a positioning arm 230 couples reference bracket 208 with suspension arm 206₁ to maintain reference bracket 208 at a fixed spatial relationship relative to the intersection point of steering axis 228 and axis 224₁ during a vertical motion of suspended wheel mount 204 relative to the reference frame and to maintain the rotating coupling point with rotating bracket 210 on steering axis 228. It is noted that the only point of contact between reference bracket 208 and suspension arm 206₁ is where positioning arm 230 couples reference bracket 208 with suspension arm 206₁. Thus reference bracket 208 can be prevented from any kind of analogous bump steer from unintentional movements of suspension arm 206₁ and/or suspended wheel mount 204, which would affect the measurements of angle sensor 212. Analogous bump steer in this respect refers to any sideways motion of reference bracket 208 caused by vertical motion of suspension arm 206₁. According to the disclosed technique, by coupling suspension arm 206₁ with reference bracket 208 indirectly via positioning arm 230, analogous bump steer of reference bracket 208 can be avoided.

According to another alternative, positioning arm 230 couples reference bracket 208 with suspension arm 206₁ such that mounting end 218 of reference bracket 208 is located on rotation axis 224₁ between suspension arm 206₁ and suspended wheel mount 204. According to yet another alternative, mounting end 218 of reference bracket 208 is positioned on a plane defined by a line perpendicular to steering axis 228 and the intersection point of steering axis 228 and rotation axis 224₁, during a vertical motion of suspended wheel mount 204 relative to the reference frame. Thus, the rotation axis of angle sensor 212 remains aligned with steering axis 228, during vertical motion of suspended wheel mount 204. In the embodiment described herein in conjunction with FIGS. 2A-2C, measurement end 216 of reference bracket 208 perpendicularly extends from a longitudinal section of reference bracket 208.

In general, a positioning arm, such as positioning arm 230 may be employed in cases where the reference bracket cannot be coupled with the suspension arm as described above, for example, due to the shape of the suspension arm, or other structural limitations. The positioning arm may be an integral part of the suspension arm or attached thereto, for example, by bolts.

Angle sensor 212 is coupled with rotating bracket 210 and with reference bracket 208 at the rotating coupling point. Thus, angle sensor 212 is configured for measuring the angle between reference bracket 208 and rotating bracket 210 and thus the angle between suspended wheel mount 204 and the reference frame. Similar to angle sensor 114 (FIGS. 1A-1C), angle sensor 212 is, for example, a rotary potentiometer, a rotary magnetic hall-effect sensor or a rotary optical encoder.

As suspended wheel mount 204 rotates, rotating bracket 210 rotates therewith. Thus, rotating bracket 210 rotates relative to reference bracket 208 (i.e., since reference bracket 208 is coupled with suspension arm 206₁ which does not rotate with suspended wheel mount 204). As suspended wheel mount 204 rotates, angle sensor 212 measures the relative angle between rotating bracket 210 and reference bracket 208. Thus, angle sensor 212 measures the rotation angle of suspended wheel mount 204 about axis 228, regardless of any vertical relative motion between suspended wheel mount 204 and the reference frame. Thus, as mentioned above, any issues related to analogous bump steer of the reference bracket (which could affect the measurement of the angle sensor) can be avoided between the reference frame and suspended wheel mount 204.

Figure 3:
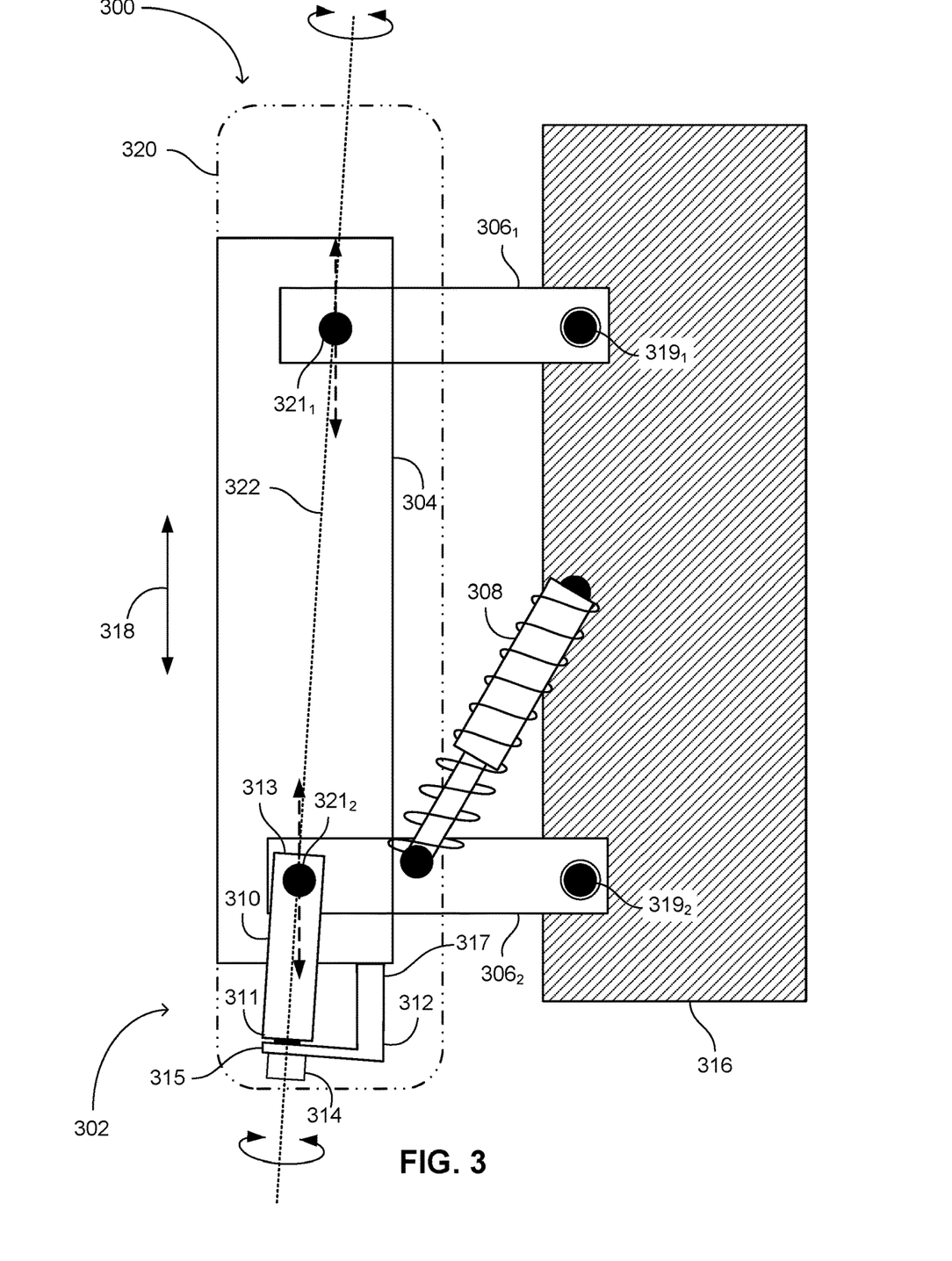
FIG. 3 is a schematic illustration of a third wheel angle measurement apparatus for a wheel assembly constructed and operative in accordance with a further embodiment of the disclosed technique.

In the examples brought forth above in conjunction with FIGS. 1A-1C and 2A-2C, the wheel angle measurement apparatus is attached to the upper side of the wheel assembly. However, the wheel angle measurement apparatus of the disclosed technique may also be attached to the bottom side of the wheel assembly. Reference is now made to FIG. 3, which is a schematic illustration of a third wheel angle measurement apparatus, generally referenced 302, for a wheel assembly, generally referenced 300, constructed and operative in accordance with a further embodiment of the disclosed technique. Wheel assembly 300 includes a suspended wheel mount 304, two suspension arms, a first suspension arm $306_1$ and a second suspension arm $306_2$ and a spring-damper assembly 308. Wheel angle measurement apparatus 302 includes a reference bracket 310, a rotating bracket 312 and an angle sensor 314. Reference bracket 310 includes a measurement end 311 and a mounting end 313. Similarly, rotating bracket 312 includes a measurement end 315 and a mounting end 317.

One end of first suspension arm $306_1$ is rotatably coupled with a reference frame 316 such that first suspension arm $306_1$ and reference frame 316 are operable to rotate with respect to one another about an axis $319_1$. Another end of first suspension arm $306_1$ is rotatably coupled with suspended wheel mount 304 (e.g., via a ball joint) such that first suspension arm $306_1$ and suspended wheel mount 304 are operable to rotate with respect to one another about an axis $321_1$. Similarly, one end of second suspension arm $306_2$ is rotatably coupled with reference frame 316 such that second suspension arm $306_2$ and reference frame 316 are operable to rotate with respect to one another about an axis $319_2$, and another end of second suspension arm $306_2$ is rotatably coupled (e.g., via a ball joint) with suspended wheel mount 304 such that second suspension arm $306_2$ and suspended wheel mount 304 are operable to rotate with respect to one another about an axis $321_2$. Axes $319_1$, $319_2$, $321_1$ and $321_2$ are oriented such that suspended wheel mount 304 may move, relative to reference frame 316, in the vertical direction as indicated by an arrow 318.

In exemplary wheel assembly 300, one end of spring-damper assembly 308 is rotatably coupled with reference frame 316 such that spring-damper assembly 308 and reference frame 316 are operable to rotate with respect to one another. The other end of spring-damper assembly 308 is rotatably coupled with second suspension arm $306_2$ such that spring-damper assembly 308 and second suspension arm $306_2$ are operable to rotate with respect to one another.

Suspended wheel mount 304 is configured to be mounted with a wheel 320. Also, suspended wheel mount 304 is configured to rotate about a rotation axis 322, for example, for steering purposes. According to the disclosed technique, wheel angle measurement apparatus 302 is configured to measure the rotation angle of suspended wheel mount 304 about axis 322. To that end, measurement end 311 of reference bracket 310 is rotatably coupled at a measurement end 315 of rotating bracket 312 such that reference bracket 310 and rotating bracket 312 can rotate with respect to one another about a rotating coupling point. Mounting end 317 of rotating bracket 312 is coupled with suspended wheel mount 304. Mounting end 313 of reference bracket 310 is coupled with second suspension arm $306_2$ such that the rotating coupling point with rotating bracket 312 is located on steering axis 322, and reference bracket 310 and rotating bracket 312 rotate with respect to one another about steering axis 322. Also, reference bracket 310 is coupled with suspension arm $306_2$ such that reference bracket 310 (i.e., any selected point on reference bracket 310) is at a fixed spatial relationship relative to the intersection point of steering axis 322 and axis $321_2$ during a vertical motion of suspended wheel mount 304 relative to reference frame 316. According to another alternative, mounting end 313 of reference bracket 310 is coupled with suspension arm $306_2$ such that mounting end 313 of reference bracket 310 is located on rotation axis $321_2$ between suspension arm $306_2$ and suspended wheel mount 304. According to yet another alternative, mounting end 313 of reference bracket 310 is positioned on a plane defined by a line perpendicular to steering axis 322 and the intersection point of steering axis 322 and rotation axis $321_2$, during a vertical motion of suspended wheel mount 304 relative to reference frame 316. Thus, the rotation axis of angle sensor 314 remains aligned with steering axis 322 during vertical motion of suspended wheel mount 304.

Angle sensor 314 is coupled with rotating bracket 312 and with reference bracket 310 at the rotating coupling point. Thus, angle sensor 314 is configured for measuring the angle between reference bracket 310 and rotating bracket 312 and thus the angle between wheel 320 and reference frame 316. Angle sensor 314 is, for example, a rotary potentiometer, a rotary magnetic hall-effect sensor or a rotary optical encoder.

As suspended wheel mount 304 rotates, rotating bracket 312 rotates therewith. Thus, rotating bracket 312 rotates relative to reference bracket 310 (i.e., since reference bracket 310 is coupled with suspension arm $306_2$ which does not rotate with suspended wheel mount 304). As suspended wheel mount 304 rotates, angle sensor 314 measures the relative angle between rotating bracket 312 and reference bracket 310. Thus, angle sensor 314 measures the rotation angle of suspended wheel mount 304 about axis 322 (i.e., relative to reference frame 316), regardless of any relative vertical motion between suspended wheel mount 304 and reference frame 316. As mentioned above, reference bracket 310 is directly coupled with second suspension arm $306_2$ with the location of mounting end 313 preventing any analogous bump steer of reference bracket 310 via unintentional movements of second suspension arm $306_2$.

As described above in conjunction with FIGS. 1A-1C, 2A-2C and 3, the wheel angle measurement apparatus according to the disclosed technique is positioned outside the volume defined by the wheel assembly. This enables adding mechanical and/or electrical sub-systems within this volume. Also, positioning the wheel angle measurement apparatus according to the disclosed technique outside the volume defined by the wheel assembly does not limit the range of motion (i.e., vertical motion or rotational motion) of the suspended wheel mount, and thus of the wheel, relative to the reference frame. It is also noted that a wheel angle measurement apparatus according to the disclosed technique is not directly connected to the steering joints.

Furthermore, an angle measurement apparatus according to the disclosed technique, as described above in conjunction with FIGS. 1A-1C, 2A-2C and 3, maintains the rotation axis of the angle sensor aligned with the steering axis, during the vertical motion of the suspended wheel mount. Thus, employing an angle measurement apparatus according to the disclosed technique, reduces measurements errors resulting from rotation of the angle sensor during vertical motion of the wheel (i.e., even if the angle of the wheel, relative to the reference frame, did not change). As mentioned above, the disclosed technique also prevents any issues related to analogous bump steer of the reference bracket (which would affect the measurement of the angle sensor). In addition, the disclosed technique in FIGS. 1A-1C, 2A-2C and 3 has been shown and described as a reference frame coupled with a suspended wheel mount via two suspension arms, however the disclosed technique can be used in wheel assemblies where the reference frame is coupled with the suspended wheel mount via at least one suspension arm, as well as via a plurality of suspension arms. Thus the disclosed technique is not limited to two suspension arms as shown in the figures.

It will be appreciated by persons skilled in the art that the disclosed technique is not limited to what has been particularly shown and described hereinabove. Rather the scope of the disclosed technique is defined only by the claims, which follow.

The invention claimed is:

1. An apparatus for measuring the steering angle of a wheel assembly comprising a suspended wheel mount and at least one suspension arm steerable about a steering rotation axis therebetween, the apparatus comprising:
   an angle sensor, having a rotation axis and pivotally coupled to at least one of said suspended wheel mount and said at least one suspension arm, for measuring a steering angle between said suspended wheel mount and said at least one suspension arm, said suspension arm being capable of motion in a vertical direction with said angle sensor and being capable of rotation with respect to said angle sensor along an axis transverse to said steering rotation axis,
   wherein said rotation axis of said angle sensor is parallel to said steering rotation axis during a vertical motion of said suspended wheel mount and also during a rotation between said suspended wheel mount and said at least one suspension arm due to said vertical motion of said suspended wheel mount.

2. The apparatus according to claim 1, wherein said angle sensor is positioned on a plane defined by said steering rotation axis of said suspended wheel mount and the rotation axis between said at least one suspension arm and said suspended wheel mount during said vertical motion of said suspended wheel mount and also during said rotation between said suspended wheel mount and said at least one suspension arm.

3. The apparatus according to claim 2, wherein said plane coincides with said at least one suspension arm such that a rotation coupling point between said suspended wheel mount and said at least one suspension arm is located on said steering rotation axis.

4. The apparatus according to claim 2, wherein said plane is located on said steering rotation axis between said at least one suspension arm and said suspended wheel mount.

5. The apparatus according to claim 1, said apparatus further comprising:
   a reference bracket, pivotally coupled to said at least one suspension arm; and
   a rotating bracket, coupled to said suspended wheel mount and rotatable about said steering rotation axis,
   wherein said angle sensor is coupled with said reference bracket.

6. The apparatus according to claim 5, wherein said reference bracket comprises a mounting end; and
   wherein a coupling of said mounting end of said reference bracket with said at least one suspension arm is such that said reference bracket is at a fixed spatial relationship relative to an intersection point of said steering rotation axis of said suspended wheel mount and a rotation axis between said at least one suspension arm and said suspended wheel mount during said vertical motion of said suspended wheel mount.

7. The apparatus according to claim 5, wherein said reference bracket comprises a mounting end; and
   wherein said mounting end of said reference bracket is positioned on a plane defined by a line perpendicular to said steering rotation axis of said suspended wheel mount and an intersection point of said steering rotation axis with a rotation axis between said at least one suspension arm and said suspended wheel mount during said vertical motion of said suspended wheel mount.

8. The apparatus according to claim 7, wherein said plane coincides with said at least one suspension arm such that a rotation coupling point between said reference bracket and said rotating bracket is located on said steering rotation axis.

9. The apparatus according to claim 7, wherein said plane is located on said steering rotation axis between said at least one suspension arm and said suspended wheel mount.

10. The apparatus according to claim 5, said rotating bracket comprising a mounting end coupled with said suspended wheel mount,
    wherein said reference bracket and said rotating bracket are rotatably coupled about a rotation coupling point such that said reference bracket and said rotating bracket can rotate with respect to one another about said steering rotation axis.

11. The apparatus according to claim 5, wherein a longitudinal section of said reference bracket is parallel with said steering rotation axis of said suspended wheel mount during said vertical motion of said suspended wheel mount, said vertical motion being relative to a reference frame.

12. The apparatus according to claim 5, wherein a mounting end of said reference bracket is located on said steering rotation axis between said at least one suspension arm and said suspended wheel mount.

13. The apparatus according to claim 5, wherein said angle sensor is coupled with said rotating bracket at a rotation coupling point.

14. The apparatus according to claim 5, wherein a mounting end of said reference bracket is positioned on a plane defined by a line perpendicular to a steering rotation axis of said suspended wheel mount and an intersection point of said steering rotation axis with a rotation axis between said at least one suspension arm and said suspended wheel mount during said vertical motion of said suspended wheel mount, said vertical motion being relative to a reference frame.

15. The apparatus according to claim 5, wherein a longitudinal section of said reference bracket is parallel with a steering rotation axis of said suspended wheel mount during said vertical motion of said suspended wheel mount, said vertical motion being relative to a reference frame.

16. A vehicle wheel assembly, comprising:
    a suspended wheel mount;
    at least one suspension arm, steerable about a steering rotation axis between said suspended wheel mount and said at least one suspension arm; and
    a steering angle measurement apparatus,
       said steering angle measurement apparatus comprising:
          an angle sensor, having a rotation axis and pivotally coupled to at least one of said suspended wheel mount and said at least one suspension arm, for measuring a steering angle between said suspended wheel mount and said at least one suspension arm, said suspension arm being capable of motion in a vertical direction with said angle sensor and being capable of rotation with respect to said angle sensor along an axis transverse to said steering rotation axis,
          wherein said rotation axis of said angle sensor is parallel to said steering rotation axis during a vertical motion of said suspended wheel mount and also during a rotation between said suspended wheel mount and said at least one suspension arm due to said vertical motion of said suspended wheel mount.

17. The vehicle wheel assembly according to claim 16, wherein said angle sensor is positioned on a plane defined by said steering rotation axis of said suspended wheel mount and the rotation axis between said at least one suspension arm and said suspended wheel mount during said vertical motion of said suspended wheel mount and also during said rotation between said suspended wheel mount and said at least one suspension arm.

18. The vehicle wheel assembly according to claim 17, wherein said plane coincides with said at least one suspension arm such that a rotation coupling point between said suspended wheel mount and said at least one suspension arm is located on said steering rotation axis.

19. The vehicle wheel assembly according to claim 17, wherein said plane is located on said steering rotation axis between said at least one suspension arm and said suspended wheel mount.

20. The vehicle wheel assembly according to claim 16, said apparatus further comprising:
- a reference bracket, pivotally coupled to said at least one suspension arm; and
- a rotating bracket, coupled to said suspended wheel mount and rotatable about said steering rotation axis,
- wherein said angle sensor is coupled with said reference bracket.

\* \* \* \* \*